US012587289B2

(12) United States Patent
Kim et al.

(10) Patent No.: US 12,587,289 B2
(45) Date of Patent: Mar. 24, 2026

(54) METHOD AND DEVICE FOR PERFORMING SENSING IN WIRELESS LAN SYSTEM

(71) Applicant: LG Electronics Inc., Seoul (KR)

(72) Inventors: Sanggook Kim, Seoul (KR); Dongguk Lim, Seoul (KR); Insun Jang, Seoul (KR); Jeongki Kim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 583 days.

(21) Appl. No.: 18/010,633

(22) PCT Filed: Jun. 15, 2021

(86) PCT No.: PCT/KR2021/007498
§ 371 (c)(1),
(2) Date: Dec. 15, 2022

(87) PCT Pub. No.: WO2021/256838
PCT Pub. Date: Dec. 23, 2021

(65) Prior Publication Data
US 2023/0254053 A1      Aug. 10, 2023

Related U.S. Application Data

(60) Provisional application No. 63/039,422, filed on Jun. 15, 2020.

(51) Int. Cl.
*H04B 17/24* (2015.01)
*H04B 17/318* (2015.01)
*H04W 84/12* (2009.01)

(52) U.S. Cl.
CPC ........... *H04B 17/24* (2015.01); *H04B 17/318* (2015.01); *H04W 84/12* (2013.01)

(58) Field of Classification Search
CPC ...................................................... H04B 17/24
See application file for complete search history.

(56) References Cited

U.S. PATENT DOCUMENTS

2014/0204891 A1* 7/2014 Park ........................ H04L 5/006
370/329
2017/0127385 A1 5/2017 Vermani et al.
(Continued)

FOREIGN PATENT DOCUMENTS

WO WO2020097487 5/2020

OTHER PUBLICATIONS

Silva, "A Channel Measurement Procedure for WLAN Sensing," IEEE 802.11-20/0842r0, Jun. 2020, 14 pages.

*Primary Examiner* — Jason E Mattis
(74) *Attorney, Agent, or Firm* — Fish & Richardson P.C.

(57) ABSTRACT

In a wireless local area network (wireless LAN) system, an initiator station (STA) can transmit a sensing initiation frame. The sensing initiation frame can include information related to a first responder STA operating as a sensing responder. The initiator STA can receive a first transmission initiation frame from the first responder STA. The first transmission initiation frame can include strength information about a first sensing signal. The initiator STA can receive the first sensing signal from the first responder STA. The sensing initiation frame can further include information related to a second responder STA operating as a sensing responder. The initiator STA can receive a second transmission initiation frame from the second responder STA. The second transmission initiation frame can include strength information about a second sensing signal. The second sensing signal can be received from the second responder STA.

4 Claims, 19 Drawing Sheets

(56)           References Cited

U.S. PATENT DOCUMENTS

| | | | |
|---|---|---|---|
| 2020/0029236 A1* | 1/2020 | Segev | H04L 5/0051 |
| 2020/0059808 A1* | 2/2020 | Lim | H04W 72/04 |
| 2020/0092850 A1* | 3/2020 | Jiang | H04W 72/04 |
| 2020/0169841 A1* | 5/2020 | Das | H04W 24/10 |

\* cited by examiner (a)

(b)

-----▶ : Sensing PPDU transmission

Sensing Initiator
Sensing Receiver

STA5

STA1          STA2          STA3          STA4

Sensing Responders
Sensing Transmitters

⟶ : Sensing PPDU transmission
----▸ : Sensing feedback transmission

Sensing Initiator
Sensing Transmitter

STA5

STA1     STA2     STA3     STA4

Sensing Responders
Sensing Receivers

1

METHOD AND DEVICE FOR PERFORMING SENSING IN WIRELESS LAN SYSTEM

CROSS-REFERENCE TO RELATED APPLICATIONS

This application is a National Stage application under 35 U.S.C. § 371 of International Application No. PCT/KR2021/007498, filed on Jun. 15, 2021, which claims the benefit of U.S. Provisional Application No. 63/039,422, filed on Jun. 15, 2020. The disclosures of the prior applications are incorporated by reference in their entirety.

TECHNICAL FIELD

The present specification relates to a technique for performing sensing in a WLAN system, and more particularly, to a procedure and a signaling method for performing sensing by a sensing initiator station (STA) and a sensing responder STA.

BACKGROUND

A wireless local area network (WLAN) has been improved in various ways. For example, IEEE 802.11b WLAN sensing is a first standard in which communication and radar technologies are integrated. Although the demand for unlicensed frequency is increasing in our daily lives and throughout the overall industry, since there are limitations in new (or fresh) supply of frequency, the communication-radar integration technology is a highly preferable orientation in the aspect of increasing efficiency in the usage of frequency. Although a sensing technology for detecting movement (or motion) behind walls by using WLAN signals, or a radar technology for detecting movement (or motion) inside a vehicle by using Frequency Modulated Continuous Wave (FMCW) signals (for example, at a 60 GHz band) are already under development, upgrading the sensing capability to a higher level by associating the current technology with the IEEE 802.11bf standardization has great significance. Most particularly, in modern society, the importance of privacy protection is becoming more emphasized. Therefore, unlike CCTVs, since the WLAN sensing technology in known to cause less legal issues related to privacy invasion, the development of WLAN sensing technology is anticipated.

Meanwhile, the overall radar market is expected to show an average annual growth of approximately 5% up to year 2025 throughout the automobile industry, national defense, industry, daily life, and so on. And, most particularly, in case of sensors used in daily life, the average annual growth is expected to mark an outstanding increase of up to 70%. The wireless LAN (WLAN) sensing technology may be extensively applied in our everyday lives so as to provide functions, such as motion detection (or recognition), respiration monitoring, positioning/tracking, falling detection, detecting presence of children in cars, emergence/proximity recognition, individual identification, bodily motion (or movement) recognition, gesture recognition, and so on. Thus, the growth of related new businesses may be promoted, and, accordingly, corporate competitiveness is expected to be improved.

SUMMARY

According to various embodiments, in a wireless local area network (wireless LAN) system, an initiator station (STA) can transmit a sensing initiation frame. The sensing initiation frame can include information related to a first responder STA operating as a sensing responder. The initiator STA can receive a first transmission initiation frame from the first responder STA. The first transmission initiation frame can include strength information about a first sensing signal. The initiator STA can receive the first sensing signal from the first responder STA. The sensing initiation frame can further include information related to a second responder STA operating as a sensing responder. The initiator STA can receive a second transmission initiation frame from the second responder STA. The second transmission initiation frame can include strength information about a second sensing signal. The second sensing signal can be received from the second responder STA.

According to an example of the present specification, power consumption can be reduced by instructing transmission suitable for the device characteristics of a WLAN sensing responder. In addition, according to an example of the present specification, by placing the load for channel environment information extraction, which requires a lot of computation, on the sensing initiator, it enables various devices, including IoT, to participate in sensing, and furthermore, it is possible to save overall power. In addition, according to an example of the present specification, since given power can be concentrated on transmission for an allocated bandwidth, a sensing operation in a more expanded area may be possible.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A. B. C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A. B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed EHT standard or IEEE 802.11bf standard.

Hereinafter, in order to describe a technical feature of the present specification, a technical feature applicable to the present specification will be described.

Figure 1:
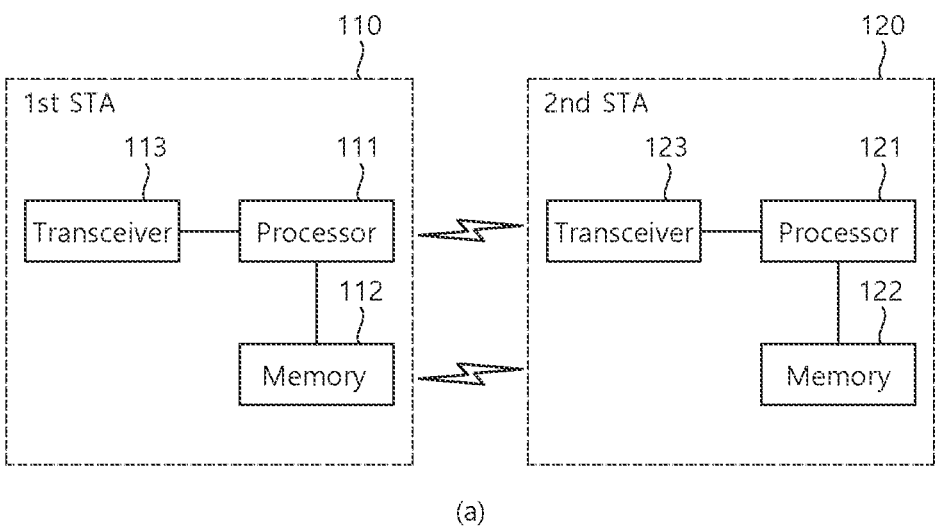
FIG. 1 illustrates an example of a transmitting apparatus and/or receiving apparatus of the present specification.
Figure 1:
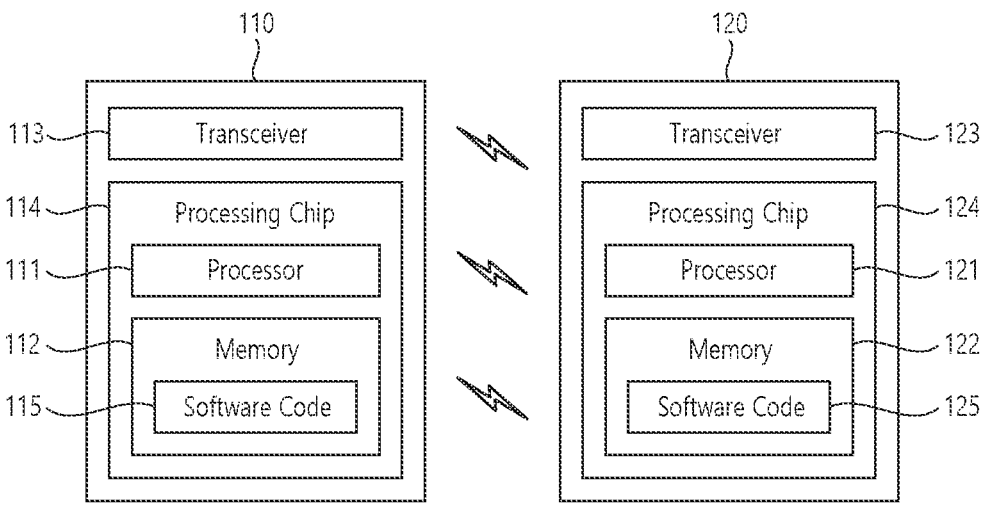

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 11*l* of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/ receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/ receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/ configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/ parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/ receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to sub-figure (b) of FIG. 1, software codes 115 and 125 may be included in the memories 112 and 122. The software codes 115 and 126 may include instructions for controlling the operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit, and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/ signal or the like may be transmitted through the downlink.

Although a WLAN sensing technology is a type of radar technology that can be implemented without any standard, by standardizing the WLAN sensing technology, more powerful performance is expected to be gained. In the IEEE 802.11bf standard, devices that participate in WLAN sensing are defined per function as shown below in the following table. In accordance with the functions, the devices may be classified as a device that initiates WLAN sensing, a device that participates in WLAN sensing, a device that transmits a sensing Physical Layer Protocol Data Unit (PPDU), a device that receives a sensing PPDU, and so on.

TABLE 1

| Terms | Functions |
| --- | --- |
| Sensing Initiator | Device that initiates sensing |
| Sensing Responder | Device that participates in sensing |
| Sensing Transmitter | Device that transmits a sensing PPDU |
| Sensing Receiver | Device that receives a sensing PPDU |

Figure 2:
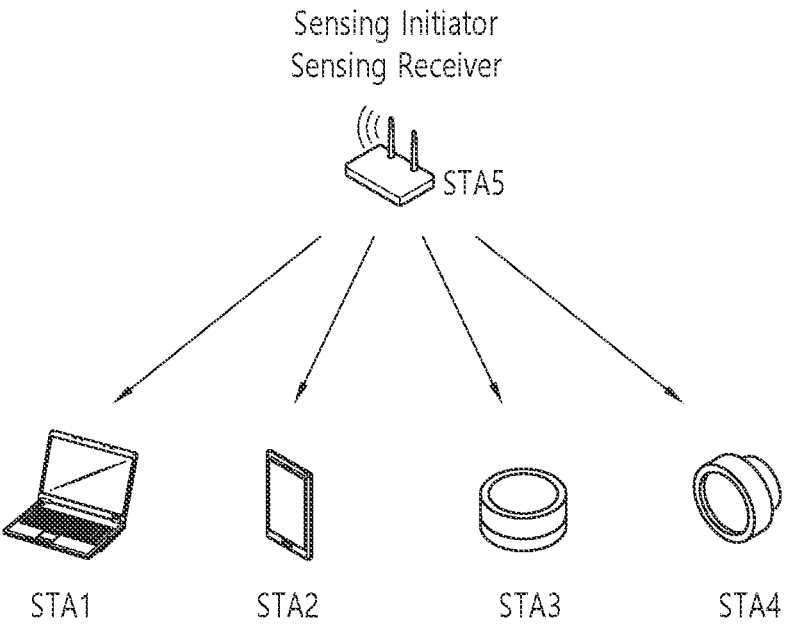
FIG. 2 illustrates an example of a WLAN sensing scenario using multiple sensing transmitting apparatuses.
Figure 3:
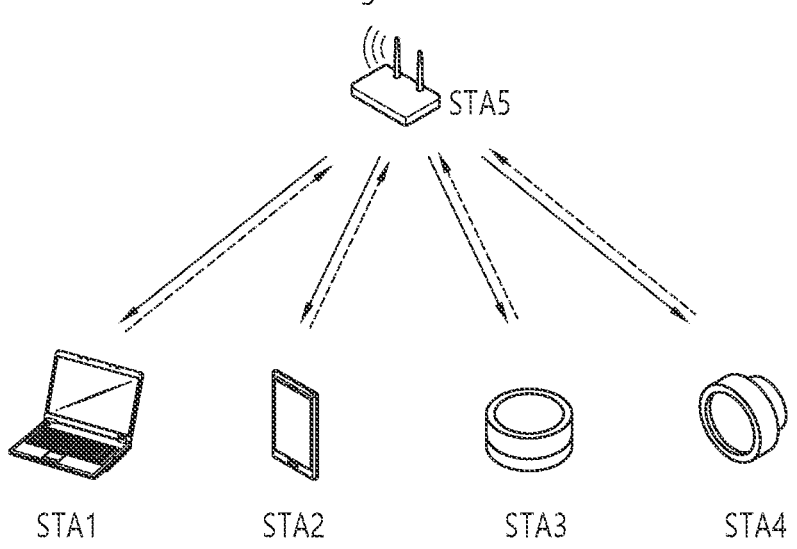
FIG. 3 illustrates an example of a WLAN sensing scenario using multiple sensing receiving apparatuses.

FIG. 2 illustrates an example of a WLAN sensing scenario using multiple sensing transmitting apparatuses. FIG. 3 illustrates an example of a WLAN sensing scenario using multiple sensing receiving apparatuses. FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in the case of FIG. 3, a procedure for transmitting (feeding back) a sensing measurement result to the sensing initiation apparatus (STA 5) is additionally required.

Figure 4:
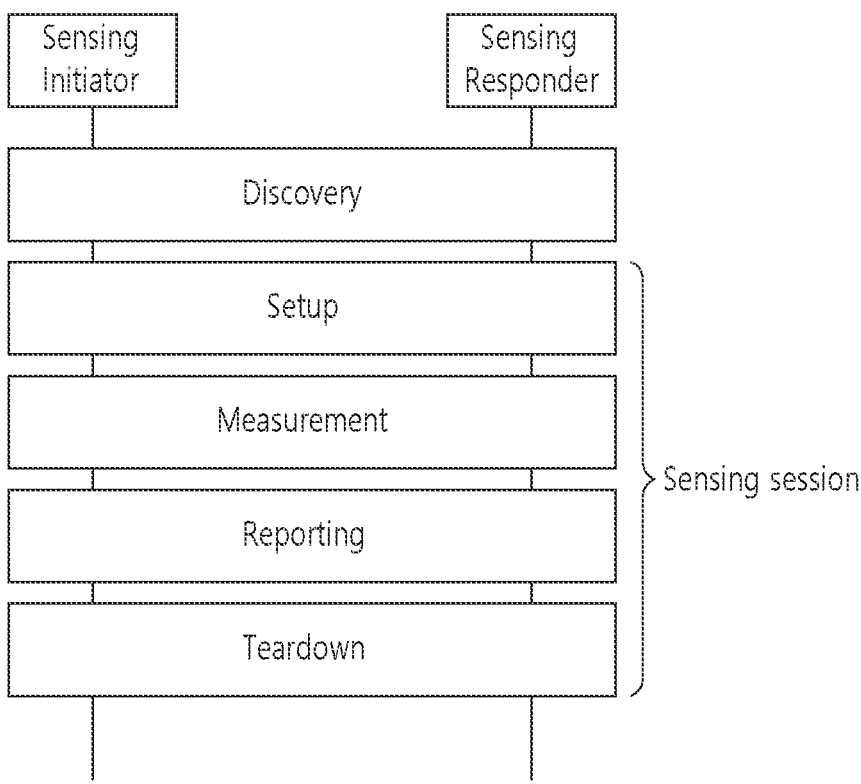
FIG. 4 illustrates an example of a WLAN sensing procedure.

FIG. 4 illustrates an example of a WLAN sensing procedure.

A procedure of WLAN sensing is performed as discovery, negotiation, measurement exchange, tear down, or the like between the WLAN sensing initiation apparatus and participating apparatuses. The discovery is a process of identifying the sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear-down is a process of terminating the sensing procedure.

Figure 5:
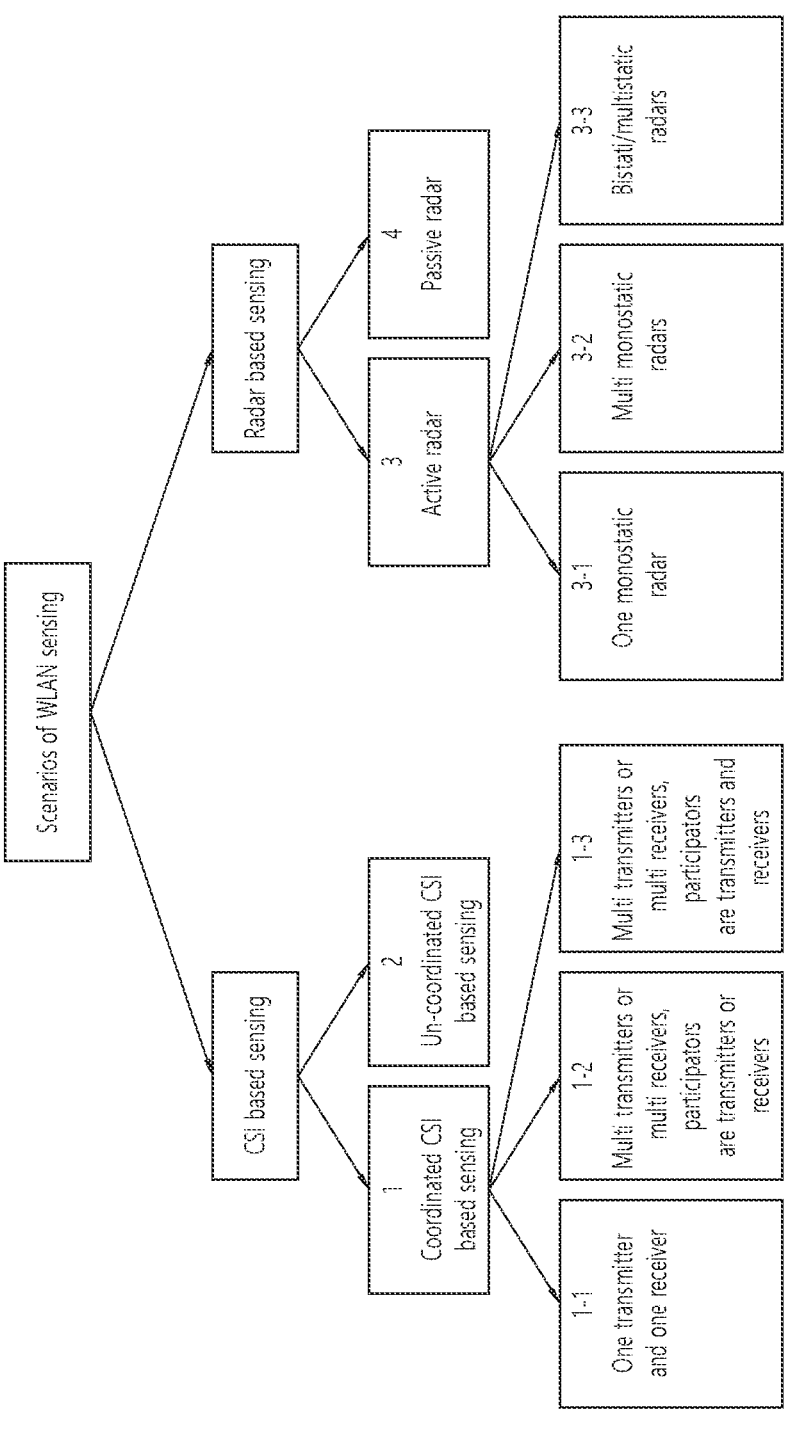
FIG. 5 is an example of classifying WLAN sensing.

FIG. 5 is an example of classifying WLAN sensing.

The WLAN sensing may be classified into CSI-based sensing which uses the channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
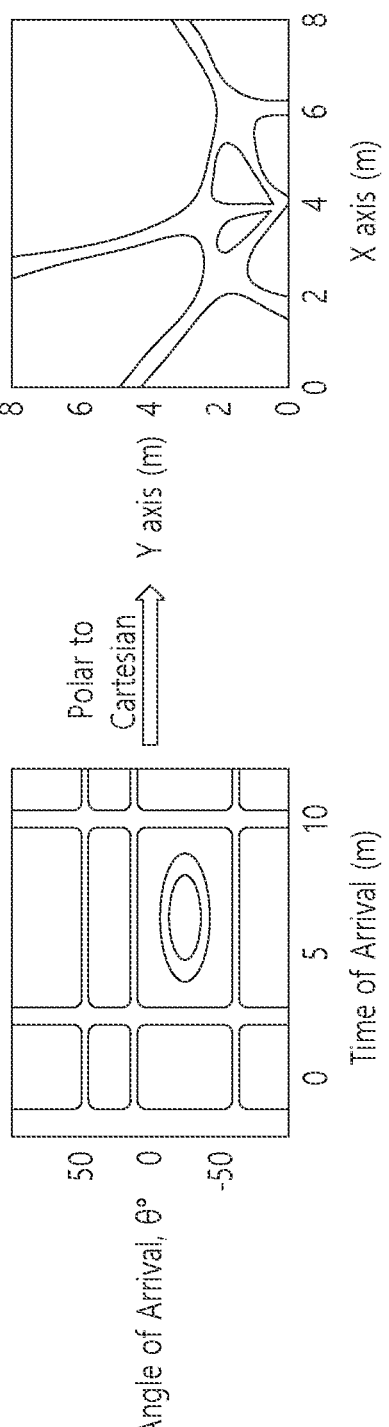
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
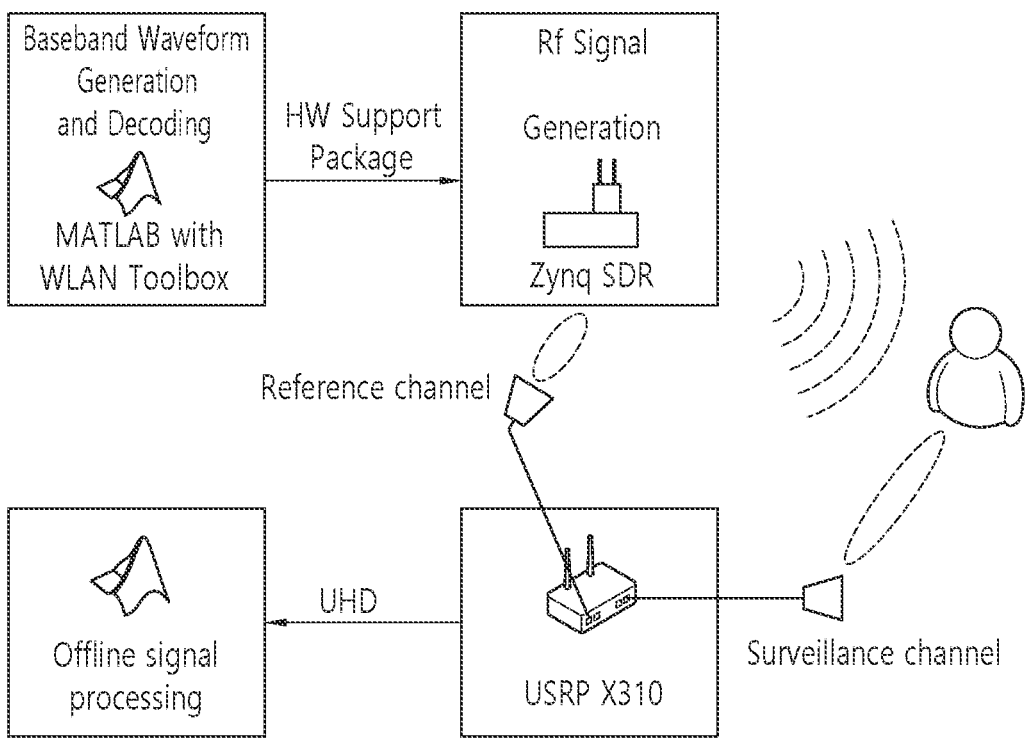
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

During its initial development phase, the current IEEE 802.11bf WLAN sensing standardization process shall handle the cooperative sensing technology, which is expected to enhance sensing accuracy in the future, as a matter of importance. The key subjects of the standardization are expected to be a synchronization technology of sensing signals for cooperative sensing, CSI management, and usage technology, sensing parameter negotiation and sharing technology, scheduling technology for CSI generation, and so on. Moreover, long-distance sensing technology, low-power sensing technology, sensing security and privacy protection technology, and so on, are also expected to be reviewed and considered as the main topics.

IEEE 802.11bf WLAN sensing is a type of radar technology that can use WLAN signals commonly existing at any time and in any place. The following table shows typical (or representative) IEEE 802.11bf usage examples. Accordingly, the IEEE 802.11bf WLAN sensing may be extensively used in our everyday lives, wherein the usage includes indoor detection, movement (or motion) detection, health care, 3D vision, various detections inside cars, and so on. Since the WLAN sensing is mostly used indoors, the motion range is within 10~20 meters, and the distance accuracy does not exceed a maximum range of 2 meters.

TABLE 2

| Name | details | Max range (m) | Key Performance Indicator | Range Accuracy (m) | Max Velocity (m/s)/Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, Heart rate etc. | 5 | Breating rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/detection aid | 3 | Fast detection of driver sleepiness | 0.01 | 1/0.1 | 3 |

Figure 8:
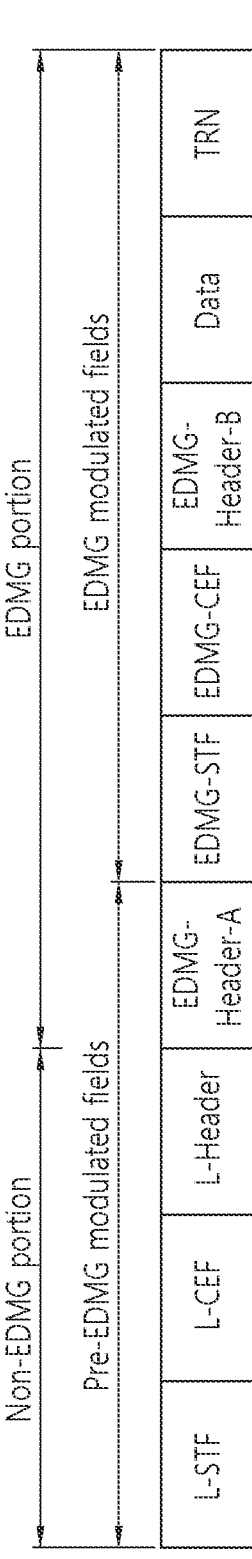
FIG. 8 is a diagram showing a simple PPDU structure that is supported in an 802.11ay WLAN system.

In IEEE 802.11, a technology for sensing a motion or gesture of an object (person or object) using a 60 GHz Wi-Fi signal (for example, 802.11ad or 802.11ay signal) is being discussed. In this specification, a method of configuring a frame format used for wi-fi sensing and a wi-fi sensing sequence are proposed. FIG. 8 is a diagram showing a simple PPDU structure that is supported in an 802.11ay WLAN system. As shown in FIG. 8, a PPDU format that is applicable to an 802.11ay system may include L-STF, L-CEF, L-Header, EDMG-Header-A, EDMG-STF, EDMG-CEF, EDMG-Header-B, Data, TRN fields, and the aforementioned fields may be optionally included in accordance with the PPDU format (e.g., SU PPDU, MU PPDU, and so on).

Herein, a part including the L-STF, L-CEF, L-Header fields may be referred to as a Non-EDMG portion, and the remaining part may be referred to as an EDMG portion. Additionally, the L-STF, L-CEF, L-Header, EDMG-Header-A fields may be referred to as pre-EDMG modulated fields, and the remaining part (or fields) may be referred to as EDMG modulated fields.

The EDMG-Header-A field includes information that is required for demodulating an EDMG PPDU. The definition of the EDMG-Header-A field is the same as that of an EDMG SC mode PPDU and an EDMG OFDM mode PPDU. However, the definition of the EDMG-Header-A field is different from that of an EDMG control mode PPDU.

The structure of the EDMG-STF depends on a number of contiguous 2.16 GHz channels through which the EDMG PPDU is transmitted and index $i_{STS}$ of an $i_{STS}$-th space-time stream. For a single space-time stream EDMG PPDU transmission using an EDMG SC mode through a single 2.16 GHz channel, the EDMG-STF field does not exist. For an EDMG SC transmission, the EDMG-STF field shall be modulated by using pi/(2-BPSK).

The structure of the EDMG-CEF depends on a number of contiguous 2.16 GHz channels through which the EDMG PPDU is transmitted and a number of space-time streams $i_{STS}$. For a single space-time stream EDMG PPDU transmission using an EDMG SC mode through a single 2.16 GHz channel, the EDMG-CEF field does not exist. For an EDMG SC transmission, the EDMG-CEF field shall be modulated by using pi/(2-BPSK).

A (legacy) preamble part of the above-described PPDU may be used for packet detection, Automatic Gain Control (AGC), frequency offset estimation, synchronization), instruction for modulation (SC or OFDM), and channel estimation. The preamble format of the PPDU may be commonly applied to an OFDM packet and an SC packet. In this case, the preamble may be configured of a Short Training Field (STF) and a Channel Estimation (CE) field that is located after the STF.

Figure 9:
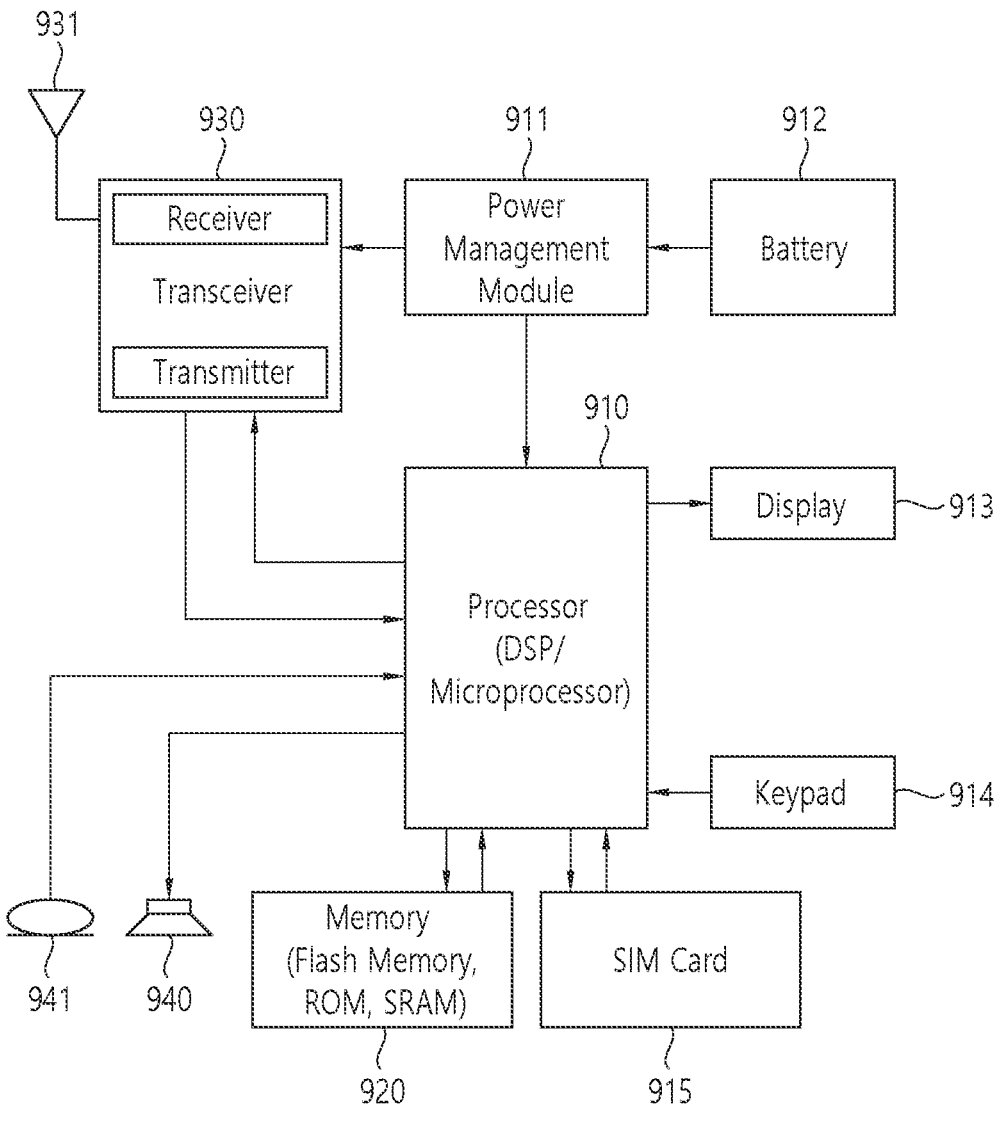
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In 11SENS, an 802.11ad and 802.11ay signal transmitting/receiving method which is a 60 GHz Wi-Fi technology is considered to sense a motion or gesture of an STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

An STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing the accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN (e.g., Wi-Fi) transmission is achieved in a broadband by using channel aggregation, channel bonding, or the like. In addition, there is an ongoing discussion on WLAN transmission in a more extended broadband.

For example, a WLAN transmission may have the following bandwidth:

20/40/80/80+80/160 MHz (802.11 ac/ax)

20/40/80+80/160/160+80/240/160+160/320 MHz (802.11 TGbe)

Transmission using a broadband has an advantage of obtaining detailed information about a channel environment. However, excessive power may be consumed due to sensing of the wideband channel environment and transmission of a lot of information due to the wideband channel environment. In particular, the operation of a WLAN sensing device using a battery may have a significant effect on power consumption.

In addition, there is a possibility that there is a diversity of supported bands and bandwidths of products equipped with WLAN (for example, Wi-Fi) transmission and reception functions. For example, the supported bands may be different, such as 2.4 GHz/2.4 GHz+5 GHz/5 GHz/6 GHz/5 GHz+6 GHz/2.4 GHz+5 GHz+6 GHz. For example, for supported bandwidth, when operating in the 6 GHz band, the maximum bandwidth supported by devices may be different, such as 40 MHz, 80 MHz, 160 MHz, 240 MHz, and 320 MHz.

Hereinafter, a method for enabling broadband operation while reducing power consumption is proposed by using one or more WLAN sensing devices in an environment with different characteristics such as supported band and bandwidth.

WLAN Sensing Initiator: An station (STA) that instructs devices having one or more sensing functions (that is, WLAN Sensing responder) to initiate a sensing session using a WLAN signal. The WLAN Sensing initiator may send a signal for sensing, and may request signal transmission for sensing from other STAs.

WLAN Sensing Responder: An STA that can participate in WLAN Sensing according to the instructions of the WLAN Sensing initiator and perform the instructed sensing, deliver signals to the initiator, or transmit signals for sensing according to the instructions of the initiator.

The sensing initiator can transmit information related to a specific band, bandwidth, and a number of transmissions used when transmitting sensing signals to sensing responders. Signals for sensing (that is, sensing signals) may be transmitted from sensing responders to sensing initiators.

Sensing responders may use a new frame or an existing frame for signal transmission. For example, a Null Data Packet (NDP) frame defined in an existing WLAN (for example, Wi-Fi) may be used as a sensing signal.

Sensing responders may inform parameters applied to the signal frame before transmitting the signal transmission frame. These parameters may contain information related to the state of the current Sensing responder that the Sensing initiator does not know about. For example, the sensing responder STA may transmit, to the sensing initiator STA, information related to transmission power according to available power, information related to how many antennas are used and how many spatial streams are used for transmission, when equipped with more than one antenna, and the like.

The state information of the sensing responder can be transmitted through a new frame or an existing frame. For example, state information of a sensing responder may be transmitted to a sensing initiator through a Null Data Packet Announcement (NDPA) frame. That is, the NDPA frame may include state information of the sensing responder.

Figure 10:
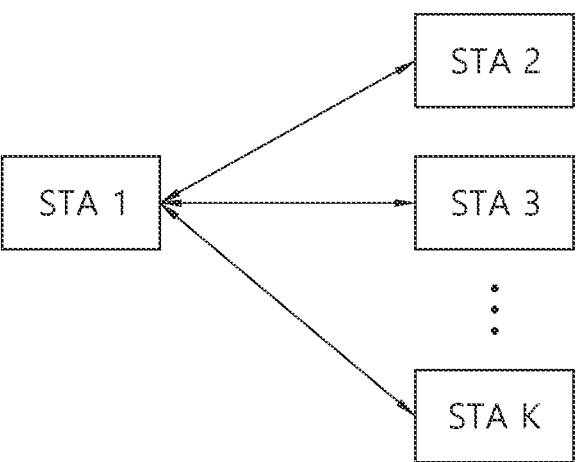
FIG. 10 is a diagram illustrating an embodiment of a connection form of WLAN sensing devices (stations).

FIG. 10 is a diagram illustrating an embodiment of a connection form of WLAN sensing devices (stations).

Referring to FIG. 10, STA 1 may be a sensing initiator STA, and STA 2. STA 3, . . . , STA K may be sensing responder STAs. Double-headed arrows indicate that information can be exchanged with each other. That is, signal transmission/reception may be performed between an STA, which is a sensing initiator, and STAs (that is, STA 2, STA 3, . . . , STA K) which are sensing responders.

The sensing procedure may be divided into a case of using a broadcast method and a case of using a unicast method. In both cases, a Sensing Initiation step and a Transmission step may be included.

1. In the Case of Using a Broadcast Transmission Method

1) Phase 1: Sensing Initiation Stage

The WLAN Sensing initiator may transmit a sensing initiation frame notifying the initiation of a sensing session. The sensing initiation frame may include information about STAs participating in sensing as responders (for example, AID, STA ID, etc.), information such as a band to be used for transmission by each sensing responder, a carrier center frequency at which transmission starts, a bandwidth, and the number of transmissions of sensing signals, and the like.

For example, a sensing session may consist of a sensing initiation frame, transmission initiation frame, and transmission of a sensing signal. The sensing initiation frame and the transmission initiation frame may be transmitted once, but the sensing signal may be transmitted once or several times. The information related to the number of transmissions may include information related to the number of sensing signals transmitted in a corresponding sensing session.

The above information can be obtained during setup or association between the sensing initiator and the sensing responders. For example, the sensing initiator STA may obtain information about other STAs in a setup step and/or an association step, and may transmit a sensing initiation frame based on information about other STAs obtained in the setup step and/or association step.

For example, if the band to be measured through sensing is 5 GHz, the measurement width is 80 MHz, and the basic bandwidth is 20 MHz, the sensing initiator STA may allocate lower 20 MHz of 80 MHz to responder STA 1 (for example, the lowest 20 MHz of the 80 MHz to be measured), lower 40 MHz to responder STA 2, and upper 40 MHz to responder STA 3 for sensing signal transmission. Here, the sensing ranges of responder STA 1 and responder STA 2 may overlap each other in frequency, and additional diversity information in the overlapped frequency part may be obtained.

For example, the sensing initiator may allocate sensing bands and bandwidths so that sensing ranges do not overlap with each other among responder STAs.

For example, the sensing initiation frame may include information on subcarriers to be used for the transmission of sensing signals in an overlapping frequency band among sensing ranges of responder STAs. The initiator STA may allocate subcarriers transmitted in overlapping bands among the sensing ranges of the responder STAs in an orthogonal manner. Therefore, sensing with high accuracy can be performed even in the presence of interference.

An existing frame (for example, Null Data Packet Announcement (NDPA)) or a new frame may be used as the sensing initiation frame notifying the initiation of the WLAN sensing session. The NDPA frame or new frame may include an indicator indicating that its purpose is WLAN sensing. For example, the NDPA frame may include fields/bits related to WLAN Sensing. Based on the corresponding field/bit, it may be determined whether the NDPA frame is used as an existing NDPA frame or as a WLAN sensing initiation frame.

Figure 11:
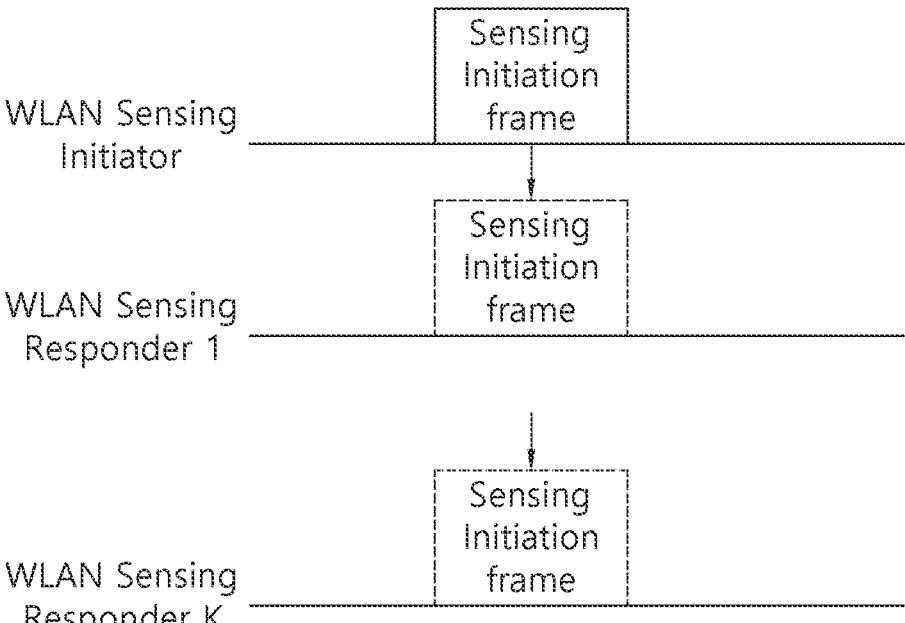
FIG. 11 is a diagram illustrating an example of a sensing initiation method through broadcasting.

FIG. 11 is a diagram illustrating an example of a sensing initiation method through broadcasting.

Referring to FIG. 11, a sensing initiation frame may be transmitted to responder STAs in a broadcasting manner. The sensing initiation frame may be anew frame or an existing frame (for example, an NDPA frame).

Figure 12:
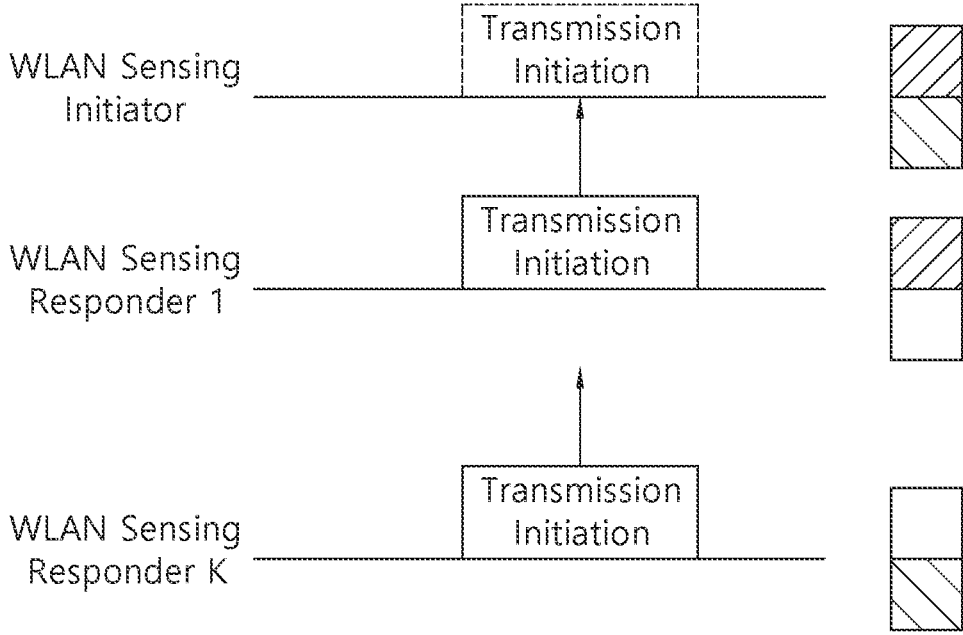
FIG. 12 is a diagram illustrating an example of a transmission method for a transmission initiation frame.

FIG. 12 is a diagram illustrating an example of a transmission method for a transmission initiation frame.

Referring to FIG. 12, the transmission initiation frame may be transmitted by the responder STA(s). For example, WLAN Sensing Responder 1 may sense the upper band of the sensing band, and WLAN Sensing Responder K may sense a lower band among sensing bands. Bands sensed by each WLAN Sensing Responder may be allocated by a sensing initiator (that is, WLAN Sensing Initiator) through a sensing initiation frame. When the WLAN Sensing Responders receive the sensing initiation frame to which the sensing band is allocated, an ACK frame may be transmitted to a sensing initiator (that is, a WLAN sensing initiator) through the allocated sensing band.

The transmission initiation frame may be transmitted in a transmission stage, and the transmission stage will be described below.

2) Phase 2: Transmission Stage by Sensing Responder(s)

WLAN Sensing responders (that is, responder STAs) may initiate transmission according to the band, carrier center frequency, and bandwidth allocated by the initiator (that is, initiator STA). That is, the responder STAs may initiate transmission (that is, sensing) based on information included in the sensing initiation frame transmitted by the initiator STA.

The transmission stage may start with the transmission of a frame (that is, a transmission initiation frame) including parameters used for transmission.

A new frame or an existing frame may be used as the transmission initiation frame. For example, a Null Data Packet Announcement (NDPA) frame may be used as a transmission initiation frame. The transmission initiation frame may include information about a sensing signal that follows. For example, the transmission initiation frame may include information related to the strength of the sensing signal, the number of antennas used for transmitting the sensing signal, the number of spatial streams, a transmission technique applied to multi-antenna transmission, the number of transmissions, and the like.

Signal transmission (for example, transmission initiation frame) by WLAN Sensing responders may be performed at a fixed time after transmission of the initiator STA's initiation frame.

The WLAN Sensing initiator can make a comprehensive decision on the channel environment by collecting the sensing signals received from each WLAN Sensing responder. For example, a new frame or NDP frame for sensing may be used as the sensing signal. Alternatively, the WLAN Sensing initiator can deliver information about the collected channel environment to an entity that can make a comprehensive decision (for example, an entity that has an application capable of performing sensing analysis).

For example, a transmission initiation frame including transmission initiation information and a sensing signal from sensing responders may be simultaneously transmitted over time. Simultaneously transmitted signals may be differentiated in frequency and/or space. For example, a plurality of responder STAs may transmit transmission initiation frames on the same time resource. However, transmission initiation frames transmitted by a plurality of responder STAs may be transmitted in different frequency bands. For example, a plurality of responder STAs may transmit transmission initiation frames on the same time and frequency resources. However, transmission initiation frames transmitted by a plurality of responder STAs may be transmitted through different spaces (for example, frequency reuse, spatial reuse, etc.).

For example, the transmission of frames and sensing signals including transmission initiation information by sensing responders may occur sequentially in time. The Sensing initiation frame transmitted by the sensing initiator STA may include information related to the transmission time or order of each sensing responder STA. That is, the sensing initiator STA may determine the order in which sensing responders transmit sensing initiation frames and/or sensing signals.

The band and bandwidth supported by the sensing initiator STA may be smaller than that of the sensing responder(s). In this case, the sensing initiator STA may allocate a sensing band to the sensing responder(s) so that all bands and bandwidths supported by the STA can be covered.

Figure 13:
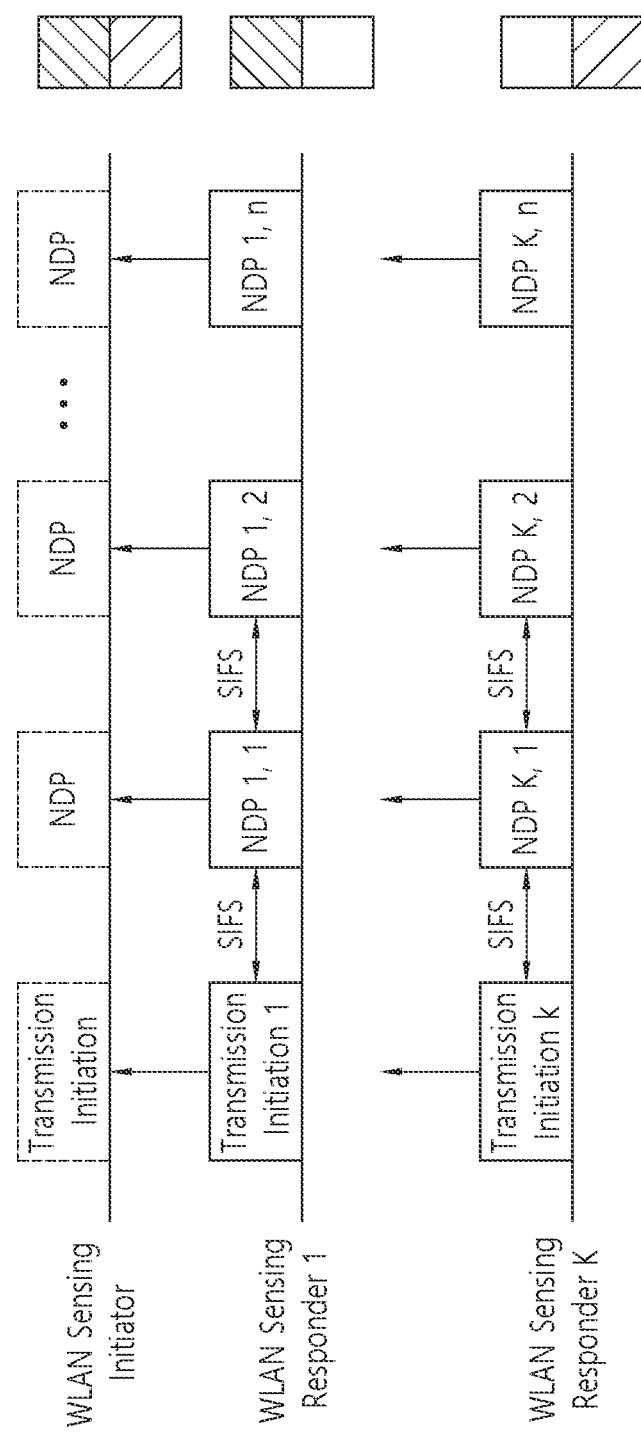
FIG. 13 is a diagram illustrating an example of a method for transmitting a transmission initiation frame and a sensing signal.

FIG. 13 is a diagram illustrating an example of a method for transmitting a transmission initiation frame and a sensing signal.

Referring to FIG. 13, n may mean the number of times the sensing signal is transmitted. In FIG. 13, it is assumed that the transmission of sensing signals occurs simultaneously in time. For example, the sensing signal may be an NDP frame.

For example, NDP A, B may refer to the B-th sensing signals transmitted by WLAN sensing responder A (that is, responder STA A). That is, NDP 1, 2 may be the second sensing signals transmitted by WLAN sensing responder 1.

For example, WLAN Sensing Responder 1 may sense the upper band of the sensing band, and WLAN Sensing Responder K may sense a lower band among sensing bands. Bands sensed by each WLAN Sensing Responder may be allocated by a sensing initiator (that is, WLAN Sensing Initiator) through a sensing initiation frame. When the WLAN Sensing Responders receive the sensing initiation frame to which the sensing band is allocated, an ACK frame may be transmitted to a sensing initiator (that is, a WLAN sensing initiator) through the allocated sensing band.

2. When Using the Unicast Transmission Method:

1) Phase 1: Sensing Initiation Stage

The WLAN sensing initiator may sequentially transmit sensing initiation frames notifying the initiation of a sensing session to each sensing responder. The sensing initiation frame may include information about STAs participating in the sensing session as sensing responders (for example, AID, STA ID, etc.), and information such as a band to be used for transmission, a carrier center frequency for initiating transmission, a bandwidth, and the number of transmissions of sensing signals, and the like.

For example, a sensing session may consist of a sensing initiation frame, transmission initiation frame, and transmission of a sensing signal. The sensing initiation frame and the transmission initiation frame may be transmitted once, but the sensing signal may be transmitted once or several times. The information related to the number of transmissions may include information related to the number of sensing signals transmitted in a corresponding sensing session.

The above information can be obtained during setup or association between the sensing initiator and the sensing responders. For example, the sensing initiator STA may obtain information about other STAs in a setup step and/or an association step, and may transmit a sensing initiation frame based on information about other STAs obtained in the setup step and/or association step.

For example, if the band to be measured through sensing is 5 GHz, the measurement width is 80 MHz, and the basic bandwidth is 20 MHz, the sensing initiator STA may allocate lower 20 MHz of 80 MHz to responder STA 1 (for example, the lowest 20 MHz of the 80 MHz to be measured), lower 40 MHz to responder STA 2, and upper 40 MHz to responder STA 3 for sensing signal transmission. Here, the sensing ranges of responder STA 1 and responder STA 2 may overlap each other in frequency, and additional diversity information in the overlapped frequency part may be obtained.

For example, the sensing responder can explicitly deliver to the sensing initiator whether to participate in sensing through ACK/NACK transmission for the session initiation frame received from the sensing initiator.

For example, the sensing responder can implicitly deliver information related to whether or not to participate in sensing to the sensing initiator through the transmission of a frame including parameters used for transmission (for example, a transmission initiation frame).

An existing frame (for example, Null Data Packet Announcement (NDPA)) or a new frame may be used as the sensing initiation frame notifying the initiation of the WLAN sensing session. The NDPA frame or new frame may include an indicator indicating that its purpose is WLAN sensing. For example, the NDPA frame may include fields/bits related to WLAN Sensing. Based on the corresponding field/bit, it may be determined whether the NDPA frame is used as an existing NDPA frame or as a WLAN sensing initiation frame.

Figure 14:
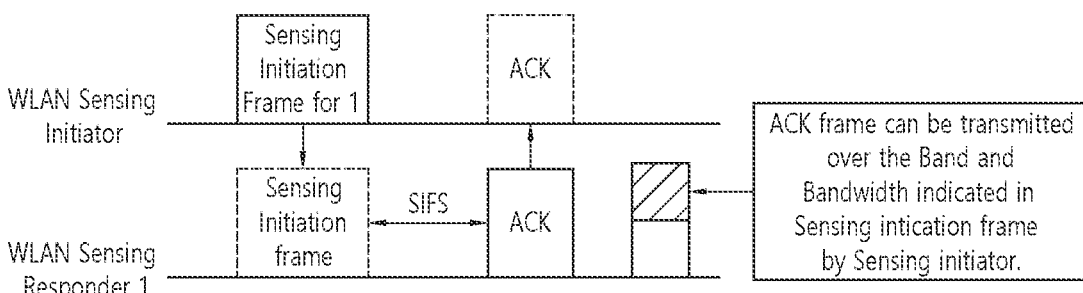
FIG. 14 is a diagram illustrating an example of a method for sensing initiation based on a unicast method.

FIG. 14 is a diagram illustrating an example of a method for sensing initiation based on a unicast method.

Referring to FIG. 14, as a sensing initiation frame transmitted to WLAN sensing responder 1, an existing frame (for example, Null Data Packet Announcement (NDPA)) or a new frame may be used. Sensing responder 1 may explicitly express an intention to participate in sensing by transmitting an ACK frame.

For example, WLAN Sensing Responder 1 may sense an upper band among sensing bands. Bands sensed by each WLAN sensing responder may be allocated by a sensing initiator (that is, WLAN sensing initiator) through a sensing initiation frame. When the WLAN sensing responders receive the sensing initiation frame to which the sensing band is allocated, an ACK frame may be transmitted to a sensing initiator (that is, a WLAN sensing initiator) through an allocated sensing band.

Figure 15:
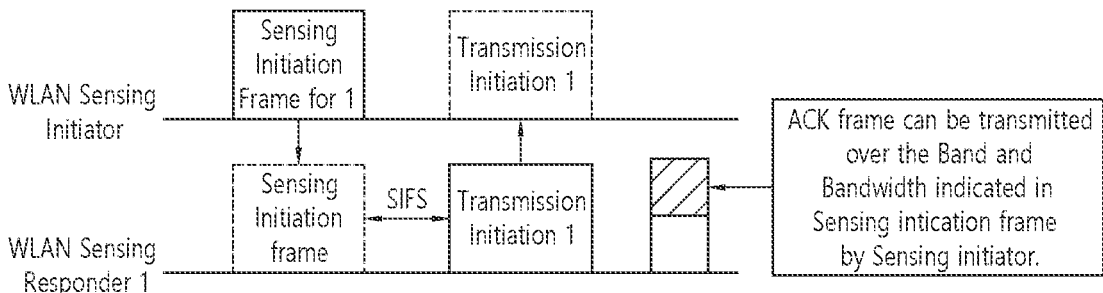
FIG. 15 is a diagram illustrating an example of a method for sensing initiation based on a unicast method.

FIG. 15 is a diagram illustrating an example of a method for sensing initiation based on a unicast method.

Referring to FIG. 15, as a sensing initiation frame transmitted to WLAN sensing responder 1, an existing frame (for example, Null Data Packet Announcement (NDPA)) or a new frame may be used. Sensing responder 1 may implicitly express an intention to participate in sensing by transmitting a transmission initiation frame (that is, transmission initiation 1).

For example, WLAN Sensing Responder 1 may sense an upper band among sensing bands. Bands sensed by each WLAN sensing responder may be allocated by a sensing initiator (that is, WLAN sensing initiator) through a sensing initiation frame. When the WLAN sensing responders receive the sensing initiation frame to which the sensing band is allocated, an ACK frame may be transmitted to a sensing initiator (that is, a WLAN sensing initiator) through an allocated sensing band.

2) Phase 2: Transmission Stage by Sensing Responder(s)

WLAN Sensing responders (that is, responder STAs) may initiate transmission according to the band, carrier center frequency, and bandwidth allocated by the initiator (that is, initiator STA). That is, the responder STAs may initiate transmission (that is, sensing) based on information included in the sensing initiation frame transmitted by the initiator STA.

The transmission stage may start with the transmission of a frame (that is, a transmission initiation frame) including parameters used for transmission.

A new frame or an existing frame may be used as the transmission initiation frame. For example, a Null Data Packet Announcement (NDPA) frame may be used as a transmission initiation frame. The transmission initiation frame may include information about a sensing signal that follows. For example, the transmission initiation frame may include information related to the strength of the sensing signal, the number of antennas used for transmitting the sensing signal, the number of spatial streams, a transmission technique applied to multi-antenna transmission, the number of transmissions, and the like.

Signal transmission (for example, transmission initiation frame) by WLAN Sensing responders may be performed at a fixed time after transmission of the initiator STA's initiation frame.

The WLAN Sensing initiator can make a comprehensive decision on the channel environment by collecting the sensing signals received from each WLAN Sensing responder. For example, a new frame or NDP frame for sensing may be used as the sensing signal.

After receiving a sensing signal from one sensing responder, the sensing initiator STA may transmit a sensing initiation frame to another sensing responder after a predetermined time. The constant time may be Short Inter-Frame Space (SIFS), Distributed Coordination Function (DCF) Inter-Frame Space (DIFS), or other defined time. That is, the sensing sessions of the sensing responder STAs may not be performed simultaneously, but a series of processes of receiving a sensing initiation frame, transmitting a transmission initiation frame, and transmitting a sensing signal may be sequentially performed for each responder STA.

Figure 16:
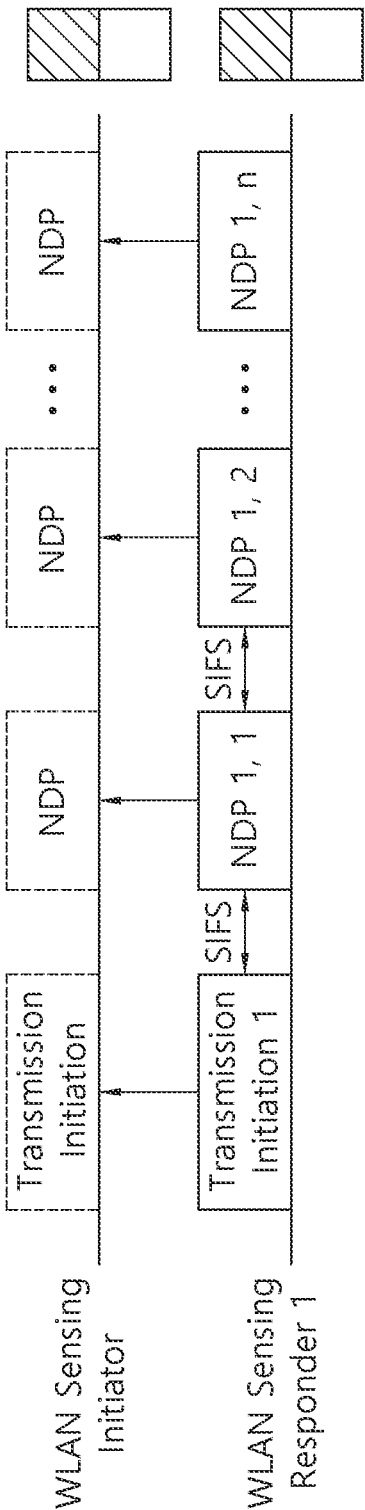
FIG. 16 is a diagram illustrating an example of a method for transmitting a transmission initiation frame and a sensing signal.

FIG. 16 is a diagram illustrating an example of a method for transmitting a transmission initiation frame and a sensing signal.

Referring to FIG. 16, n may mean the number of times the sensing signal is transmitted. In FIG. 13, it is assumed that the transmission of sensing signals occurs simultaneously in time. For example, the sensing signal may be an NDP frame.

For example, NDP A, B may refer to the B-th sensing signals transmitted by WLAN sensing responder A (that is, responder STA A). That is, NDP 1, 2 may be the second sensing signals transmitted by WLAN Sensing responder 1.

After transmitting the sensing initiation frame, the responder STA may transmit NDP frames, which are sensing signals, n times.

Figure 17:
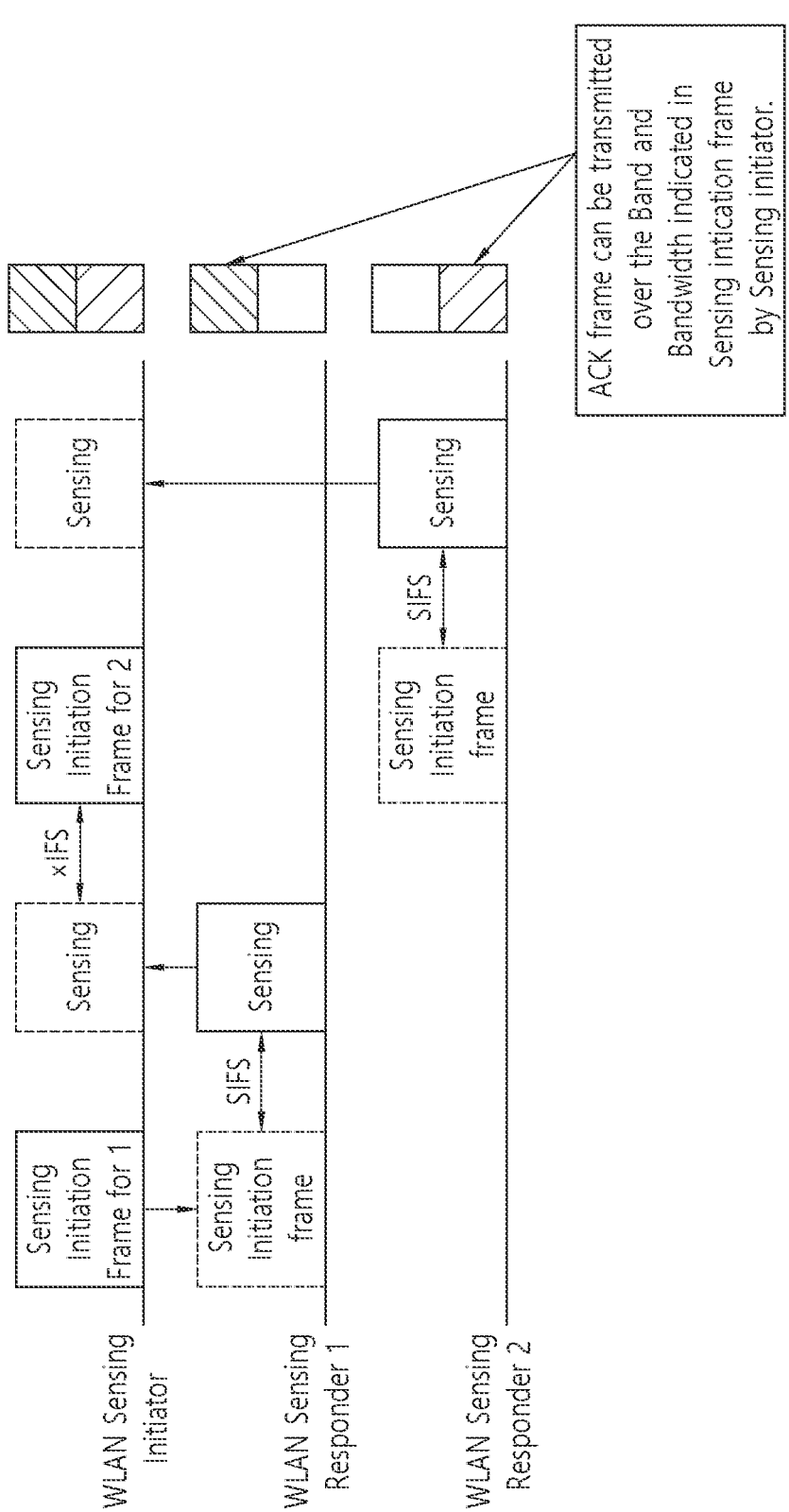
FIG. 17 is a diagram showing an example of an overall procedure of sensing.

FIG. 17 is a diagram showing an example of an overall procedure of sensing.

Referring to FIG. 17, "sensing" may be an operation including the transmission of an ACK frame/transmission initiation frame and transmission of a sensing signal. xIFS may mean SIFS. DIFS, and the like. After the sensing session (i.e., sensing initiation frame reception, transmission initiation frame transmission, sensing signal transmission) of the WLAN Sensing Responder 1 ends, the sensing session of the WLAN Sensing Responder 2 may be started. For example, WLAN Sensing Responder 1 may sense an upper band of the sensing band, and WLAN Sensing Responder 2 may sense a lower band of the sensing band. Bands sensed by each WLAN Sensing Responder may be allocated by a sensing initiator (that is, WLAN Sensing Initiator) through a sensing initiation frame. When the WLAN sensing responders receive the sensing initiation frame to which the sensing band is allocated, an ACK frame may be transmitted to a sensing initiator (that is, a WLAN sensing initiator) through the allocated sensing band.

According to an example of the present specification, power consumption can be reduced by instructing transmission suitable for the device characteristics of a WLAN sensing responder. In addition, according to an example of the present specification, by placing the load for channel environment information extraction, which requires a lot of computation, on the sensing initiator, it enables various devices, including IoT, to participate in sensing, and furthermore, it is possible to save overall power. In addition, according to an example of the present specification, since given power can be concentrated on transmission for an allocated bandwidth, a sensing operation in a more expanded area may be possible.

Figure 18:
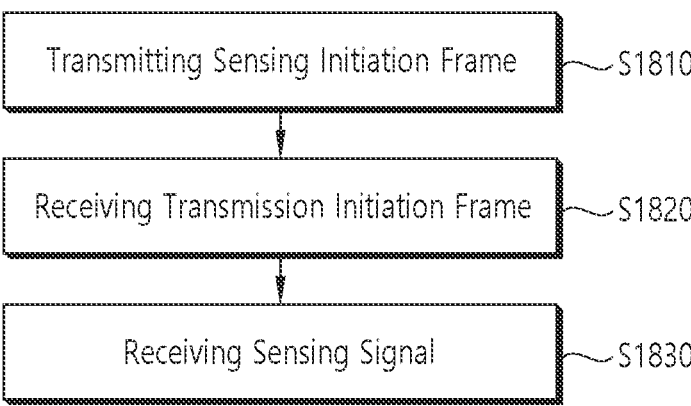
FIG. 18 is a diagram illustrating an embodiment of a method for operating an initiator STA.

FIG. 18 is a diagram illustrating an embodiment of a method for operating an initiator STA.

Referring to FIG. 18, an STA operation may be based on technical features described in at least one of FIGS. 1 to 17.

An initiator STA is an STA that initiates a sensing operation, and may include the above-described initiator, initiation STA, WLAN sensing initiator, and the like.

The initiator STA may transmit a sensing initiation frame (S1810). For example, an initiator STA may transmit a sensing initiation frame, and the sensing initiation frame may include information related to a first responder STA operating as a sensing responder.

The initiator STA may receive a transmission initiation frame (S1820). For example, the initiator STA may receive a first transmission initiation frame from the first responder STA. For example, the first transmission initiation frame may include strength information of the first sensing signal.

The initiator STA may receive a sensing signal (S1830). For example, the initiator STA may receive the first sensing signal from the first responder STA.

For example, the sensing initiation frame may further include information related to a second responder STA operating as a sensing responder.

For example, the initiator STA may receive a second transmission initiation frame from the second responder STA, wherein the second transmission initiation frame includes strength information on a second sensing signal. The initiator STA may receive the second sensing signal from the second responder STA.

For example, the first sensing signal and the second sensing signal may be transmitted through different frequencies at the same time.

For example, the first sensing signal and the second sensing signal may be transmitted through different spaces in the same time and frequency resources.

For example, the first and second transmission initiation frames may include information related to a transmission order of the first and second sensing signals. The first and second sensing signals may be received in order, based on the information related to the transmission order.

For example, the sensing initiation frame may further include information related to a band in which a sensing responder transmits a signal, the total bandwidth to be measured, a bandwidth of a sensing signal, allocated bandwidth for each sensing responder, and a number of transmissions of sensing signals.

For example, the first transmission initiation frame may further include information related to a number of antennas, a number of spatial streams, a multi-antenna transmission technique used for transmission of the first sensing signal, and information related to a number of transmissions of the first sensing signal.

Figure 19:
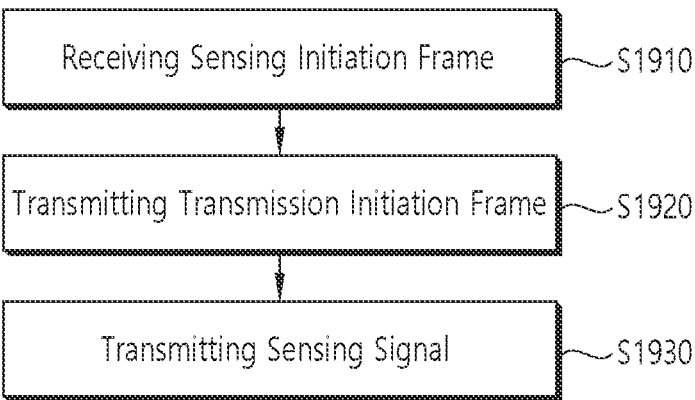
FIG. 19 is a diagram illustrating an embodiment of a method for operating a responder STA.

FIG. 19 is a diagram illustrating an embodiment of a method for operating a responder STA.

Referring to FIG. 19, an AP operation may be based on technical features described in at least one of FIGS. 1 to 17.

The responder STA is an STA that performs a sensing operation in response to the initiator STA that initiates the sensing operation, and may include the above-described responder, responding STA, WLAN Sensing responder, and the like.

The responder STA may receive the sensing initiation frame (S1910). For example, a responder STA may receive a sensing initiation frame from an initiator STA, and the sensing initiation frame may include information related to the responder STA operating as a sensing responder.

The responder STA may transmit a transmission initiation frame (S1920). For example, the responder STA may transmit a transmission initiation frame to the initiator STA. For example, the transmission initiation frame may include information on the strength of a sensing signal.

The responder STA may transmit a sensing signal (S1930). For example, the responder STA may transmit the sensing signal to the initiator STA.

For example, the sensing initiation frame may further include information related to a second responder STA operating as a sensing responder.

For example, the initiator STA may receive a second transmission initiation frame from the second responder STA, wherein the second transmission initiation frame includes strength information on a second sensing signal. The initiator STA may receive the second sensing signal from the second responder STA.

For example, the first sensing signal and the second sensing signal may be transmitted through different frequencies at the same time.

For example, the first sensing signal and the second sensing signal may be transmitted through different spaces in the same time and frequency resources.

For example, the first and second transmission initiation frames may include information related to a transmission order of the first and second sensing signals. The first and second sensing signals may be received in order, based on the information related to the transmission order.

For example, the sensing initiation frame may further include information related to a band in which a sensing responder transmits a signal, the total bandwidth to be measured, a bandwidth of a sensing signal, allocated bandwidth for each sensing responder, and a number of transmissions of sensing signals.

For example, the first transmission initiation frame may further include information related to a number of antennas, a number of spatial streams, a multi-antenna transmission technique used for transmission of the first sensing signal, and information related to a number of transmissions of the first sensing signal.

Some of detailed steps shown in the example of FIG. 18 and FIG. 19 may not be essential steps and may be omitted. Other steps may be added in addition to the steps shown in FIG. 18 and FIG. 19, and orders of the steps may vary. Some steps the above steps may have independent technical meaning.

The aforementioned technical feature of the present specification may be applied to various apparatuses and methods. For example, the aforementioned technical feature of the present specification may be performed/supported through the apparatus of FIG. 1 and/or FIG. 9. For example, the aforementioned technical feature of the present specification may be applied only to part of FIG. 1 and/or FIG. 9. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 910 and memory 920 of FIG. 9. For example, the apparatus of the present specification includes: a memory: and a processor operatively coupled to the memory. The processor may be adapted to: transmit a sensing initiation frame, wherein the sensing initiation frame includes information related to a first responder STA operating as a sensing responder: receive, from the first responder STA, a first transmission initiation frame, wherein the first transmission initiation frame includes strength information on a first sensing signal, and receive, from the first responder STA, the first sensing signal.

The technical feature of the present specification may be implemented based on a computer readable medium (CRM). For example, the CRM proposed by the present specification is at least one computer readable medium having an instruction executed by at least one processor of an initiator station (STA) of a wireless local area network (WLAN) system to perform an operation comprising: transmitting a sensing initiation frame, wherein the sensing initiation frame includes information related to a first responder STA operating as a sensing responder: receiving, from the first responder STA, a first transmission initiation frame, wherein the first transmission initiation frame includes strength information on a first sensing signal: and receiving, from the first responder STA, the first sensing signal.

Instructions stored in a CRM of the present specification may be executed by at least one processor. The at least one processor related to the CRM of the present specification may be the processors 111 and 121 or processing chips 114 and 124 of FIG. 1 or the processor 910 of FIG. 9. Meanwhile, the CRM of the present specification may be the memories 112 and 122 of FIG. 1 or the memory 920 of FIG. 9 or a separate external memory/storage medium/disk or the like.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed in a wireless local area network (WLAN) system, the method comprising:

transmitting, by a first station (STA), a first sensing frame, wherein the first sensing frame includes information related to a second STA operating as a sensing responder, wherein the first sensing frame further includes bit information indicating whether the first sensing frame is used as a null data physical protocol data unit announcement (NDPA) frame or a sensing initiation frame, wherein the NDPA frame is followed by a null data physical protocol data unit (NDP) frame transmitted by the first STA;

based on the bit information indicating the first sensing frame used as the sensing initiation frame, receiving, from the second STA, a second sensing frame, wherein an interframe space (IFS) between the first sensing frame and the second sensing frame is defined as a short IFS (SIFS), wherein the second sensing frame is followed by a sensing measurement signal transmitted by the second STA, wherein an IFS between the second sensing frame and the sensing measurement signal is defined as an SIFS, wherein the second sensing frame includes strength information related to the sensing measurement signal, information related to a number of spatial streams for the sensing measurement signal, and information related to a number of transmissions for the sensing measurement signal; and receiving, from the second STA, the sensing measurement signal.

2. The method of claim 1, wherein the first sensing frame further includes information related to a band in which the sensing measurement signal is transmitted, information related to a bandwidth to be measured, information related to a bandwidth of the sensing measurement signal, information related to an allocated bandwidth for each sensing responder, and information related to a number of transmissions for the sensing measurement signal.

3. A first station (STA) configured to operate in a wireless local area network (WLAN) system, the first STA comprising:

a transceiver transmitting and receiving a radio signal; and a processor connected to the transceiver, wherein the processor is adapted to:

transmit a first sensing frame, wherein the first sensing frame includes information related to a second STA operating as a sensing responder, wherein the first sensing frame further includes bit information indicating whether the first sensing frame is used as a null data physical protocol data unit announcement (NDPA) frame or a sensing initiation frame, wherein the NDPA frame is followed by a null data physical protocol data unit (NDP frame transmitted by the first STA;

based on the bit information indicating the first sensing frame used as the sensing initiation frame, receive, from the second STA, a second sensing frame, wherein an interframe space (IFS) between the first sensing frame and the second sensing frame is defined as a short IFS (SIFS), wherein the second sensing frame is followed by a sensing measurement signal transmitted by the second STA, wherein an IFS between the second sensing frame and the sensing measurement signal is defined as an SIFS, wherein the second sensing frame includes strength information related to the sensing measurement signal, information related to a number of spatial streams for the sensing measurement signal, and information related to a number of transmissions for the sensing measurement signal; and receive, from the second STA, the sensing measurement signal.

4. The first STA of claim 3, wherein the first sensing frame further includes information related to a band in which the sensing measurement signal is transmitted, information related to a bandwidth to be measured, information related to a bandwidth of the sensing measurement signal, information related to an allocated bandwidth for each sensing responder, and information related to a number of transmissions for the sensing measurement signal.

* * * * *